Patented Mar. 16, 1926.

1,577,426

UNITED STATES PATENT OFFICE.

ALFONS G. SCHURICHT AND GEORGE T. WRIGHT, OF ALTON, ILLINOIS, ASSIGNORS TO WESTERN CARTRIDGE COMPANY, OF EAST ALTON, ILLINOIS, A CORPORATION OF DELAWARE.

COMPOSITION AND PROCESS OF MAKING THE SAME.

No Drawing. Original application filed February 25, 1924, Serial No. 695,098. Divided and this application filed August 31, 1925. Serial No. 53,734.

*To all whom it may concern:*

Be it known that we, ALFONS G. SCHURICHT and GEORGE T. WRIGHT, citizens of the United States, and residing at Alton, county of Madison, State of Illinois, have invented the new and useful Improvement in Compositions and Processes of Making the Same, of which the following is a specification.

This invention relates to compositions, and more particularly to compositions utilizing or employing polymerizable oils, such as China-wood oil. This application is a division of application Serial Number 695,098, filed February 25, 1924.

One of the objects of this invention is to provide a composition adapted for varied purposes, and more particularly to provide an efficient binder.

Another object is to provide a polymerized oil, and more particularly China-wood oil adapted for efficient and practical utilization.

Further objects will appear from the detail description in which will be described an illustrative embodiment of this invention; it is to be understood, however, that the invention is susceptible of other embodiments not specifically described.

In accordance with this invention the basis of the composition is a polymerized oil, such as China-wood oil, (*Aleurites cordata* or *Elæocca vernicia*). Generally stated the oil is prepared by heating the same at a temperature and for a period sufficient to polymerize the same; or more specifically stated, at a temperature and for a period sufficient to form a jelly and quenching the same. Where China-wood oil is used, a definite quantity of the oil has preferably added thereto a definite proportion of a suitable drier, and one that is adapted for this particular purpose is a metallic drier containing about 12% of lead or manganese oxide. Thus lead resinate prepared by fusing together 70 parts of resin and 12 parts of litharge forms a highly satisfactory drier for accelerating the final curing. About 4.5% of this metallic drier is added.

The polymerizable oil, such as China-wood oil (preferably with the drier added) is heated to a temperature of about 450° F. The heating is effected in such a manner that the temperature can be closely controlled and the mass is kept agitated by stirring or otherwise; this is important since it is very essential that the temperature be closely regulated and that the mass be uniformly heated. The time required to bring the oil to the required temperature is about one and one-half hours, and after being brought to that temperature is maintained at 450° F. until polymerization has been carried to the desired point. This requires from one to one and one-half hours. During this latter period the oil gradually thickens and becomes sticky. The final stages of the polymerization are extremely rapid and the process must be closely controlled at this point. The heating is carried on to a point where the oil solidifies to a jelly-like mass which has a slight tendency to crumble. However, it is still very sticky and if the action is allowed to proceed beyond this point, the oil becomes dry and very crumbly and loses its adhesive properties, rendering the oil valueless as a binder. Accordingly as soon as the complete degree of polymerization has been reached, the oil is immediately quenched by dumping it into cold water which stops the reaction at once. The completely polymerized oil is removed from the water when cooled and placed on a screen so as to allow the water to drain from it.

The polymerized China-wood oil so produced is of the consistency of a jelly and is crumbly, yet sticky. It can be used for various purposes as a binder for various bindable materials. Suitable bindable materials are of granular form and of a cellular organic type, such as ground cork, in the form known to the trade as ground flour, although cork of any other form of granulation may be used; moreover other bindable materials may be used, such as saw-dust or wood-meal.

The proportions of bindable material to the polymerized oil, such as China-wood oil, will vary, depending upon the physical properties desired in the finished product. If it is desired to have a soft flexible article, the percentage of bindable material, such as cork, should be greater than that of the polymerized oil, while for very hard and tough articles, the percentage of oil and cork should be about equal. Good results are obtained with from 40 to 50 per cent of polymerized China-wood oil and from 60 to 50 per cent of cork flour. These percentages and relative proportions may, however, be varied within limitations.

The prepared polymerized oil is mixed with a bindable material in the proper proportions and then mixed and kneaded in any suitable kneading machine, such as of the Werner & Fleiderer type; into such a machine the full quantity of prepared oil and bindable material, such as cork, is weighed. The mixing and kneading is carried on for an extent sufficient to secure thorough incorporation of the prepared oil and bindable material and until no free oil is visible and until the entire mass is crumbly, yet sticky. This time is usually from one and one-half to two hours. The mixture is then screened and disintegrated, the disintegration being accomplished in any suitable manner as by passing the mixture between intermeshing pins on a plate and a cylinder so that the mixture is completely disintegrated. There is thus formed a composite mixture of a bindable material and a polymerized oil, such as China-wood oil, of the consistency of jelly; this mixture is crumbly, yet sufficiently sticky so that the particles will adhere when the mixture is submitted to pressure in molds or the like to form articles. Various suitable articles may be made of this mixture and the article can either be allowed to cure by exposure to the air, or this curing can be accelerated by heat. For complete curing the temperature should be maintained between 200 and 220 degrees Fahrenheit and one and one-half hours exposure at this temperature will completely cure small articles. This curing will cause the mass to become cemented, for while before curing the mass is friable, after such curing or cementation the mass becomes firm, tough and pliable and the product obtained is a pliable article which is useful for various purposes.

It is obvious that various changes may be made in details without departing from the spirit of this invention; it is, therefore, to be understood that this invention is not to be limited to the specific details described.

Having thus described the invention, what is claimed is:

1. The process consisting in heating China-wood oil at a temperature and for a period sufficient to form a jelly and quenching the same.

2. The process consisting in heating China-wood oil at a temperature of about 450° F. for about one to one and one-half hours.

3. The process consisting in heating China-wood oil at a temperature of about 450° F. for about one to one and one-half hours and quenching the same.

4. The process consisting in heating China-wood oil at a temperature and for a period sufficient until it has a tendency to crumble and then quenching the same.

5. The process consisting in heating China-wood oil and a drier at a temperature and for a period sufficient to form a jelly and quenching the same.

6. Polymerized China-wood oil of the consistency of jelly and crumbly.

7. Polymerized China-wood oil of the consistency of jelly and crumbly, yet sticky.

In testimony whereof we affix our signatures this 26th day of June, 1925.

ALFONS G. SCHURICHT.
GEORGE T. WRIGHT.